US011935083B2

(12) United States Patent
Marueli et al.

(10) Patent No.: US 11,935,083 B2
(45) Date of Patent: *Mar. 19, 2024

(54) SYSTEM AND METHOD FOR NAVIGATING DRIVERS TO SERVICE TRANSPORTATION REQUESTS HAVING SURGE PRICING MULTIPLIERS AND SURGE PRICING CAPS

(71) Applicant: Lyft, Inc., San Francisco, CA (US)

(72) Inventors: Sunny Marueli, Nes Ziona (IL); Talmon Marco, Tel Aviv (IL); Igor Magazinik, Ramat Gan (IL)

(73) Assignee: Lyft, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/338,374

(22) Filed: Jun. 3, 2021

(65) Prior Publication Data
US 2021/0287238 A1 Sep. 16, 2021

Related U.S. Application Data

(63) Continuation of application No. 15/290,323, filed on Oct. 11, 2016, now Pat. No. 11,049,124.

(60) Provisional application No. 62/319,311, filed on Apr. 7, 2016.

(51) Int. Cl.
*G06Q 30/02* (2023.01)
*G06Q 30/0201* (2023.01)
*G06Q 50/30* (2012.01)

(52) U.S. Cl.
CPC ......... *G06Q 30/0206* (2013.01); *G06Q 50/30* (2013.01)

(58) Field of Classification Search
CPC .......................................... G06Q 10/00–90/10
See application file for complete search history.

(56) References Cited

U.S. PATENT DOCUMENTS

| 2008/0195428 | A1* | 8/2008 | O'Sullivan | G06Q 50/30 705/6 |
| 2009/0106124 | A1* | 4/2009 | Yang | G06Q 30/0601 705/26.1 |
| 2010/0241349 | A1 | 9/2010 | Wu | |
| 2012/0290507 | A1 | 11/2012 | Sun et al. | |
| 2013/0268406 | A1* | 10/2013 | Radhakrishnan | G06Q 30/0284 705/26.61 |
| 2014/0006237 | A1 | 1/2014 | Chiang | |

(Continued)

FOREIGN PATENT DOCUMENTS

| CN | 103377489 A | 10/2013 |
| WO | WO 2014/036332 A1 | 3/2014 |

OTHER PUBLICATIONS

U.S. Appl. No. 15/290,323, May 30, 2019, Office Action.

(Continued)

*Primary Examiner* — Arif Ullah
(74) *Attorney, Agent, or Firm* — Keller Preece PLLC

(57) ABSTRACT

In one embodiment, a method comprises receiving, at a server comprising at least one processor, a transportation request from a computing device of a passenger, the transportation request specifying a pickup location; and determining, by the server, a surge pricing multiplier and a surge pricing cap for the transportation request based on the pickup location, the surge pricing cap representing a maximum amount of a fare for the transportation request that is subject to a surge pricing surcharge.

20 Claims, 8 Drawing Sheets

(56) References Cited

U.S. PATENT DOCUMENTS

| | | |
|---|---|---|
| 2014/0067490 A1 | 3/2014 | James et al. |
| 2014/0074757 A1 | 3/2014 | De Gennaro et al. |
| 2016/0110836 A1 | 4/2016 | Garg et al. |
| 2016/0125662 A1 | 5/2016 | Fujita et al. |
| 2017/0154348 A1* | 6/2017 | Biswas .............. G06Q 30/0222 |
| 2017/0193574 A1 | 7/2017 | Marueli |
| 2017/0293925 A1 | 10/2017 | Marueli et al. |

OTHER PUBLICATIONS

U.S. Appl. No. 15/290,323, Dec. 12, 2019, Office Action.
U.S. Appl. No. 15/290,323, Sep. 17, 2020, Notice of Allowance.
U.S. Appl. No. 15/290,323, Feb. 18, 2021, Notice of Allowance.
U.S. Appl. No. 14/985,630, Aug. 8, 2019, Office Action.
U.S. Appl. No. 14/985,630, Apr. 6, 2020, Office Action.
U.S. Appl. No. 14/985,630, Jan. 4, 2021, Office Action.

\* cited by examiner

SYSTEM AND METHOD FOR NAVIGATING DRIVERS TO SERVICE TRANSPORTATION REQUESTS HAVING SURGE PRICING MULTIPLIERS AND SURGE PRICING CAPS

CROSS-REFERENCE TO RELATED APPLICATIONS

This application is a continuation of U.S. patent application Ser. No. 15/290,323, filed on Oct. 11, 2016, which claims the benefit of and priority to provisional application No. 62/319,311 filed Apr. 7, 2016. Each of the aforementioned applications is hereby incorporated by reference in its entirety.

TECHNICAL FIELD

This disclosure relates in general to the field of mobile applications and, more particularly, to a system and method for navigating drivers to service transportation requests having surge pricing multipliers and surge pricing caps.

BACKGROUND

A transportation service may utilize a plurality of drivers that fulfill passenger requests for transportation. A transportation service may provide one or more mobile applications that facilitate the efficient pairing of passengers and drivers. The transportation service may receive a transportation request and select a driver to fulfill the request based on information associated with the transportation request and information associated with the driver.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In one embodiment, a method comprises receiving, at a server comprising at least one processor, a transportation request from a computing device of a passenger, the transportation request specifying a pickup location; and determining, by the server, a surge pricing multiplier and a surge pricing cap for the transportation request based on the pickup location, the surge pricing cap representing a maximum amount of a fare for the transportation request that is subject to a surge pricing surcharge.

EXAMPLE EMBODIMENTS

Figure 1:
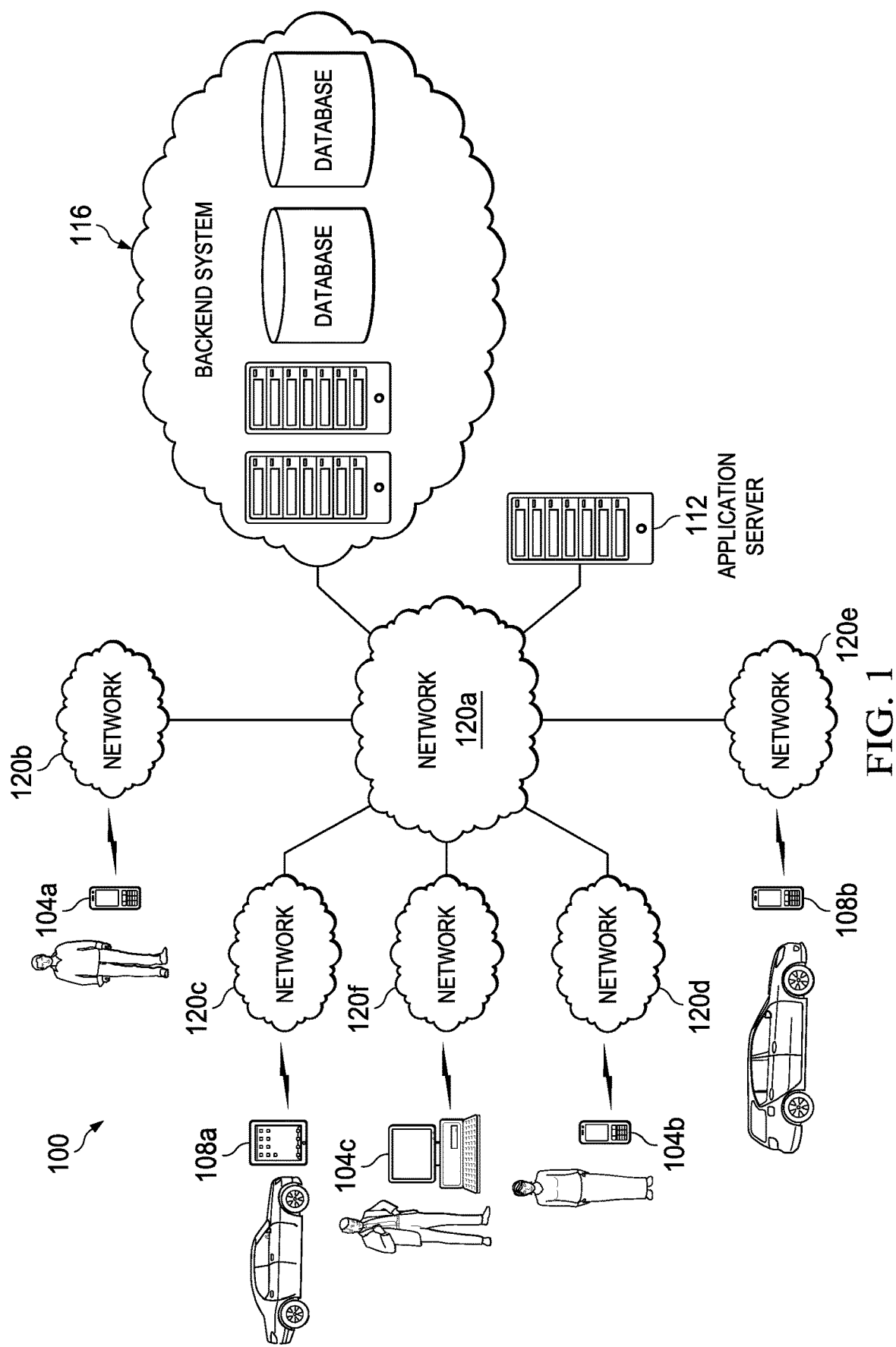
FIG. 1 illustrates a block diagram of a transportation system in accordance with certain embodiments.

FIG. 1 illustrates a block diagram of a system 100 for navigating drivers to service transportation requests having surge pricing multipliers and surge pricing caps in accordance with certain embodiments. Although various embodiments may include any number of drivers, passengers, and associated devices, system 100 depicts three passengers having associated passenger computing devices 104 and two drivers having associated driver computing devices 108. The computing devices are coupled through various networks 120 to an application server 112 and a backend system 116.

Various embodiments of the present disclosure may enhance the experience of passengers associated with a transportation service by navigating drivers to service transportation requests having surge pricing multipliers and surge pricing caps. Various embodiments may provide technical advantages such as improving the integrity of processed and communicated data of devices of the transportation system, reducing processing and communication resources expended by reducing the number of transportation requests that will be generated due to pricing discrepancies, and other technical advantages.

Computing devices 104 and 108 may include any electronic computing device operable to receive, transmit, process, and store any appropriate data. In various embodiments, computing devices 104 and 108 may be mobile devices or stationary devices. As examples, mobile devices may include laptop computers, tablet computers, smartphones, personal digital assistants, smartwatches, computers integrated with a vehicle, computers integrated with clothing, and other devices capable of connecting (e.g., wirelessly) to one or more networks 120 while stationary devices may include desktop computers, televisions, or other devices that are not easily portable. Devices 104 and 108 may include a set of programs such as operating systems (e.g., Microsoft Windows, Linux, Android, Mac OSX, Apple iOS, UNIX, or other operating system), applications, plug-ins, applets, virtual machines, machine images, drivers, executable files, and other software-based programs capable of being run, executed, or otherwise used by the respective devices. Each computing device can include at least one graphical display and user interface allowing a user to view and interact with applications and other programs of the computing device. In a particular embodiment, computing device 108 may be a hardened device that is configured to only run a driver application using a specialized operating system (e.g., a modified version of Android). In one embodiment, a transportation service may issue or otherwise facilitate the provision of hardened devices to its drivers, but restrict the functionality of the devices to the driver application (i.e., the devices may be locked down so as not to allow the installation of additional applications or may only allow preapproved applications to be installed).

In various embodiments, a driver computing device 108 may be integrated within and/or communicate with a self-driven vehicle (e.g., a vehicle that has the capability of driving without physical steering guidance from a human being) and may influence the movement of the vehicle by providing route information (e.g., passenger pick-up and destination locations driver destination locations, navigational directions, etc.) to the self-driven vehicle. Accordingly, as used herein "driver" may refer to a human being that may physically drive or otherwise control movement of a vehicle or to the vehicle itself (e.g., in the case of a self-driven vehicle) or component thereof (e.g., computing device application 108 or logic thereof).

In particular embodiments, a passenger application runs on passenger computing devices 104. The application may allow a user to enter various account information (e.g., in connection with a registration with the transportation service) to be utilized by a transportation service. For example, the account information may include a user name and password (or other login credentials), contact information of the user (e.g., phone number, home address), payment information (e.g., credit card numbers or bank account numbers and associated information), or car preference information (e.g., what models or color of car the user prefers).

The application may allow a user to request a ride from the transportation service. In various embodiments, the application may establish a pick-up location automatically or based on user input (e.g., locations may include the current location of the computing device 104 as determined by a global positioning system (GPS) of the computing device or a different user-specified location). In certain embodiments, the user may specify a destination location as well. The locations may be specified in any suitable format, such as GPS coordinates, street address, establishment name (e.g., LaGuardia Airport, Central Park, etc.), or other suitable format. At any time (e.g., before the ride, during the ride, or after the ride is complete) the user may specify a method of payment to be used for the ride. The user may also specify whether the request is for immediate pick-up or for a specified time in the future. In various embodiments, the user may specify pick-up by a vehicle that has particular merchandise available for use by the user, such as a specified type of battery charger, bottle of water or other food or beverage, umbrella, or other suitable merchandise. The user may also specify criteria for the driver, such as a minimum performance rating, such that drivers having performance ratings below the minimum performance rating will not be considered during selection of the driver.

The user may use the application to order a ride based on the specified information. The request for the ride is generated based on the information and transmitted to backend system 116. Backend system 116 will facilitate the selection of a driver. In some embodiments, backend system 116 may select a driver based on any suitable factors, such as the information contained in the request from the passenger, the proximity of the driver to the passenger, or other suitable factors. In other embodiments, backend system 116 may select a plurality of drivers that could fulfill the ride request, send information associated with the drivers to the passenger, and allow the passenger to select the driver to be used via the application on the passenger computing device 104. Any suitable information about the potential driver(s) may be sent to the computing device 104 either before or after the selection of the driver by the passenger, such as a location of a driver, an estimated pick-up time, a type of car used by a driver, the merchandise available in the car, driver ratings or comments from other passengers about the driver, or other suitable information.

Once a driver has been selected and has accepted the request to provide a ride, the application may notify the user of the selected driver and provide real-time updates of the driver's location (e.g., with respect to the passenger's location) and estimated pick-up time. The application may also provide contact information for the driver and/or the ability to contact the driver through the application (e.g., via a phone call or text). Once the ride has begun, the application may display any suitable information, such as the current location of the computing device 104 and the route to be taken. Upon completion of the ride, the application may provide the passenger the ability to rate the driver or provide comments about the driver.

In particular embodiments, a driver application runs on driver computing devices 108. The application may allow a driver to enter various account information to be utilized by a transportation service. For example, the account information may include a user name and password (or other login credentials), contact information of the driver (e.g., phone number, home address), information used to collect payment (e.g., bank account information), vehicle information (e.g., what model or color of car the driver utilizes), merchandise offered by the driver, or other suitable information.

In various embodiments, the application may allow a driver to specify his availability to transport passengers for the transportation service. In some embodiments, the driver may select between multiple levels of availability. In one example, the driver may be "available," meaning that the driver is willing to receive and consider any transportation requests that the transportation service sends the driver; the driver may be "unavailable," meaning that the driver is not willing to receive any transportation requests (e.g., this state may be explicitly indicated by the driver inputting this state into his computing device or may be detected through a deduction that the driver's device is not logged in to the transportation service through the driver application), or the driver may be "inactive," meaning that the driver only desires to receive particular requests meeting certain exception criteria.

The application may periodically transmit the current location of the computing device 108 as determined by a GPS of the computing device 108 to the backend system 116. When a driver is selected to provide (or is identified as a suitable candidate for) a ride, backend system 116 may send a notification to the driver application. In some embodiments, the driver may have a limited amount of time to select whether the driver accepts the ride. In other embodiments, the application may be configured by the driver to automatically accept the ride or to automatically accept the ride if certain criteria are met (e.g., fare minimum, direction of travel, minimum passenger rating, etc.).

Once a pairing of the driver and the passenger is confirmed by backend system 116, the application may navigate the driver to the passenger. The application may also provide contact information for the passenger and/or the ability to contact the passenger through the application (e.g., via a phone call, email, instant message, or text). The application may also navigate the driver to the passenger's destination once the ride begins. Upon completion of the ride, the application may provide the driver the ability to rate the passenger or provide comments about the passenger.

System 100 may include one or more application servers 112 coupled to the computing devices through one or more networks 120. The passenger application and driver application may be supported with, downloaded from, served by, or otherwise provided through an application server 112 or other suitable means. In some instances, the applications can be downloaded from an application storefront onto a particular computing device using storefronts such as Google Android Market, Apple App Store, Palm Software Store and App Catalog, RIM App World, etc., or other sources. In various embodiments, the passenger application and driver application may be installed on their respective devices in any suitable manner and at any suitable time. As one example, a passenger application may be installed on a computing device as part of a suite of applications that are pre-installed prior to provision of the computing device to a consumer. As another example, a driver application may be installed on a computing device by a transportation service (or an entity that provisions computing devices for the transportation service) prior to the issuance of the device to a driver that is employed or otherwise associated with the transportation service.

As described above, applications utilized by computing devices 104 and 108 can make use of a backend system 116. Backend system 116 may comprise any suitable servers or other computing devices that facilitate the provision of a transportation service as described herein. For example, backend system 116 may receive a request from a passenger and facilitate the assignment of a driver to fulfill the request. Backend system 116 is described in more detail in connection with FIG. 3.

In general, servers and other computing devices of backend system 116 or application server 112 may include electronic computing devices operable to receive, transmit, process, store, or manage data and information associated with system 100. As used in this document, the term computing device, is intended to encompass any suitable processing device. For example, portions of backend system 116 or application server 112 may be implemented using servers (including server pools) or other computers. Further, any, all, or some of the computing devices may be adapted to execute any operating system, including Linux, UNIX, Windows Server, etc., as well as virtual machines adapted to virtualize execution of a particular operating system, including customized and proprietary operating systems.

Further, servers and other computing devices of system 100 can each include one or more processors, computer-readable memory, and one or more interfaces, among other features and hardware. Servers can include any suitable software component or module, or computing device(s) capable of hosting and/or serving a software application or services (e.g., services of application server 112 or backend system 116), including distributed, enterprise, or cloud-based software applications, data, and services. For instance, servers can be configured to host, serve, or otherwise manage data sets, or applications interfacing, coordinating with, or dependent on or used by other services, including transportation service applications and software tools. In some instances, a server, system, subsystem, or computing device can be implemented as some combination of devices that can be hosted on a common computing system, server, server pool, or cloud computing environment and share computing resources, including shared memory, processors, and interfaces.

In various embodiments, backend system 116 or any components thereof may be deployed using a cloud service such as Amazon Web Services, Microsoft Azure, or Google Cloud Platform. For example, the functionality of the backend system 116 may be provided by virtual machine servers that are deployed for the purpose of providing such functionality or may be provided by a service that runs on an existing platform.

System 100 also includes various networks 120 used to communicate data between the computing devices 104 and 108, the backend system 116, and the application server 112. The networks 120 described herein may be any suitable network or combination of one or more networks operating using one or more suitable networking protocols. A network may represent a series of points, nodes, or network elements and interconnected communication paths for receiving and transmitting packets of information. For example, a network may include one or more routers, switches, firewalls, security appliances, antivirus servers, or other useful network elements. A network may provide a communicative interface between sources and/or hosts, and may comprise any public or private network, such as a local area network (LAN), wireless local area network (WLAN), metropolitan area network (MAN), Intranet, Extranet, Internet, wide area network (WAN), virtual private network (VPN), cellular network (implementing GSM, CDMA, 3G, 4G, LTE, etc.), or any other appropriate architecture or system that facilitates communications in a network environment depending on the network topology. A network can comprise any number of hardware or software elements coupled to (and in communication with) each other through a communications medium. In some embodiments, a network may simply comprise a transmission medium such as a cable (e.g., an Ethernet cable), air, or other transmission medium.

Figure 2:
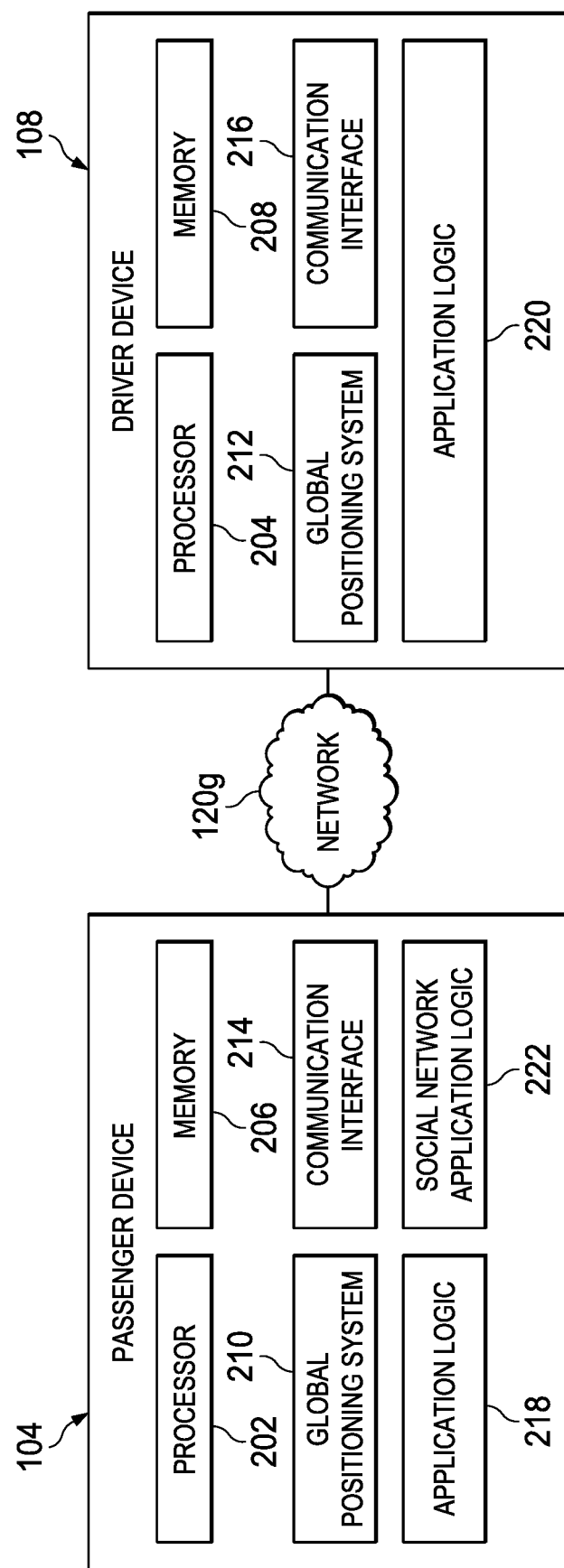
FIG. 2 illustrates a block diagram of a passenger computing device and a driver computing device of the system of FIG. 1 in accordance with certain embodiments.

FIG. 2 illustrates a block diagram of a passenger computing device 104 and a driver computing device 108 of the system of FIG. 1 in accordance with certain embodiments. Herein, "passenger computing device" may be used to refer to a computing device used by a subscriber that has registered an account with the transportation service or other user who interacts with the transportation service (e.g., by communicating with the transportation service to request transportation) while "driver computing device" may be used to refer to a computing device used by a driver of the transportation service. A subscriber may refer to an individual or entity that has provided account data (e.g., user name, password, payment information, telephone number, home address, other account information, or any suitable combination thereof) to backend system 116 for storage by the backend system 116. In the embodiment shown, the devices may be communicatively coupled through network 120g which may include any suitable intermediary nodes, such as a backend system 116.

In the embodiment depicted, computing devices 104 and 108 each include a computer system to facilitate performance of their respective operations. In particular embodiments, a computer system may include a processor, storage, and one or more communication interfaces, among other components. As an example, computing devices 104 and 108 each include one or more processors 202 and 204, memory elements 206 and 208, and communication interfaces 214 and 216, among other hardware and software. These components may work together in order to provide functionality described herein.

A processor 202 or 204 may be a microprocessor, controller, or any other suitable computing device, resource, or combination of hardware, stored software and/or encoded logic operable to provide, either alone or in conjunction with other components of computing devices 104 and 108, the functionality of these computing devices. In particular embodiments, computing devices 104 and 108 may utilize multiple processors to perform the functions described herein.

A processor can execute any type of instructions to achieve the operations detailed in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an application specific integrated circuit (ASIC) that includes digital logic, software, code, electronic instructions, or any suitable combination thereof.

Memory 206 and 208 may comprise any form of non-volatile or volatile memory including, without limitation, random access memory (RAM), read-only memory (ROM), magnetic media (e.g., one or more disk or tape drives), optical media, solid state memory (e.g., flash memory), removable media, or any other suitable local or remote memory component or components. Memory 206 and 208 may store any suitable data or information utilized by computing devices 104 and 108, including software embedded in a computer readable medium, and/or encoded logic incorporated in hardware or otherwise stored (e.g., firmware). Memory 206 and 208 may also store the results and/or intermediate results of the various calculations and determinations performed by processors 202 and 204.

Communication interfaces 214 and 216 may be used for the communication of signaling and/or data between computing devices 104 and 108 and one or more networks (e.g., 120g) and/or network nodes (e.g., backend system 116 and application server 112) coupled to a network or other communication channel. For example, communication interfaces 214 and 216 may be used to send and receive network traffic such as data packets. Each communication interface 214 and 216 may send and receive data and/or signals according to a distinct standard such as an LTE, IEEE 802.11, IEEE 802.3, or other suitable standard. In various embodiments, any of the data described herein as being communicated between elements of system 100 may be data generated using voice commands from a user or data generated independently of voice commands (e.g., data may be generated by a processor in response to the processor receiving data from another element or from an input device such as a touch screen). Communication interfaces 214 and 216 may include antennae and other hardware for transmitting and receiving radio signals to and from other devices in connection with a wireless communication session over one or more networks 120.

GPS units 210 and 212 may include any suitable hardware and/or software for detecting a location of their respective computing devices 104 and 108. For example, a GPS unit may comprise a system that receives information from GPS satellites, wireless or cellular base stations, and/or other suitable source and calculates a location based on this information (or receives a calculated position from a remote source). In one embodiment, the GPS unit is embodied in a GPS chip.

Application logic 218 may include logic providing, at least in part, the functionality of the passenger application described herein. Similarly, application logic 220 may include logic providing, at least in part, the functionality of the driver application described herein. In a particular embodiment, the logic of devices 104 and 108 may include software that is executed by processor 202 and 204. However, "logic" as used herein, may include but not be limited to hardware, firmware, software and/or combinations of each to perform a function(s) or an action(s), and/or to cause a function or action from another logic, method, and/or system. In various embodiments, logic may include a software controlled microprocessor, discrete logic (e.g., an application specific integrated circuit (ASIC)), a programmed logic device (e.g., a field programmable gate array (FPGA)), a memory device containing instructions, combinations of logic devices, or the like. Logic may include one or more gates, combinations of gates, or other circuit components. Logic may also be fully embodied as software.

In various embodiments of the present disclosure, in addition to any combination of the features described above with respect to the passenger application, application logic 218 may provide additional features for the passenger application to enhance a passenger's experience.

Further according to various embodiments, when a user operates passenger computing device 104, a fare may be displayed to the user, wherein the fare is a distance-weighted continuous price function as disclosed herein.

In a particular embodiment, a user may supply login credentials for a social network system (e.g., FACEBOOK) or other social media system (e.g., TWITTER) to the transportation service through application logic 218. The transportation service (e.g., through backend server) may then access the user's account on the social network system or other social media system and access information associated with the user's account. As another example, passenger application logic 218 may access the user's social media account directly and integrate information from the account with other functionality of the passenger application logic.

Social network application logic 222 may provide a user interface to allow a passenger to interact with (e.g., enter and transmit information to and view information received from) a social network system. A social network system may store a record (i.e., a user profile) for each user of the system. The user profile may include any suitable information about the user, such as contact information, employment information, demographic information, personal interests, user-generated content, or other suitable information. The social network system may also store a record of the user's relationship with other users of the social network system. For example, such information may be stored as a social graph, wherein users (e.g., individuals, groups, business entities, organizations, etc.) may be represented as nodes in the graph and the nodes may be connected based on relationships between the users. A social network system may provide various services (e.g., photo sharing, wall posts, messaging, games, or advertisements) facilitating interaction between the users.

In various embodiments, the social network system may interact with passenger application logic 218 or backend system 116 to enhance the functionality of these components. As an example, background information associated with a passenger may be obtained by a backend system 116 and used to determine whether to route a request from the passenger to a particular driver.

In various embodiments, the social network system may provide any of the functionality listed above with respect to passenger application logic 218 in allowing a user to request a ride and may relay received requests for rides to backend system 116 along with any suitable identifying information about the user to facilitate pickup by a driver.

In various embodiments of the present disclosure, in addition to any combination of the features described above with respect to the driver application, driver application logic 220 may provide additional features for the driver application to enhance the functionality of the transportation service.

Figure 3:
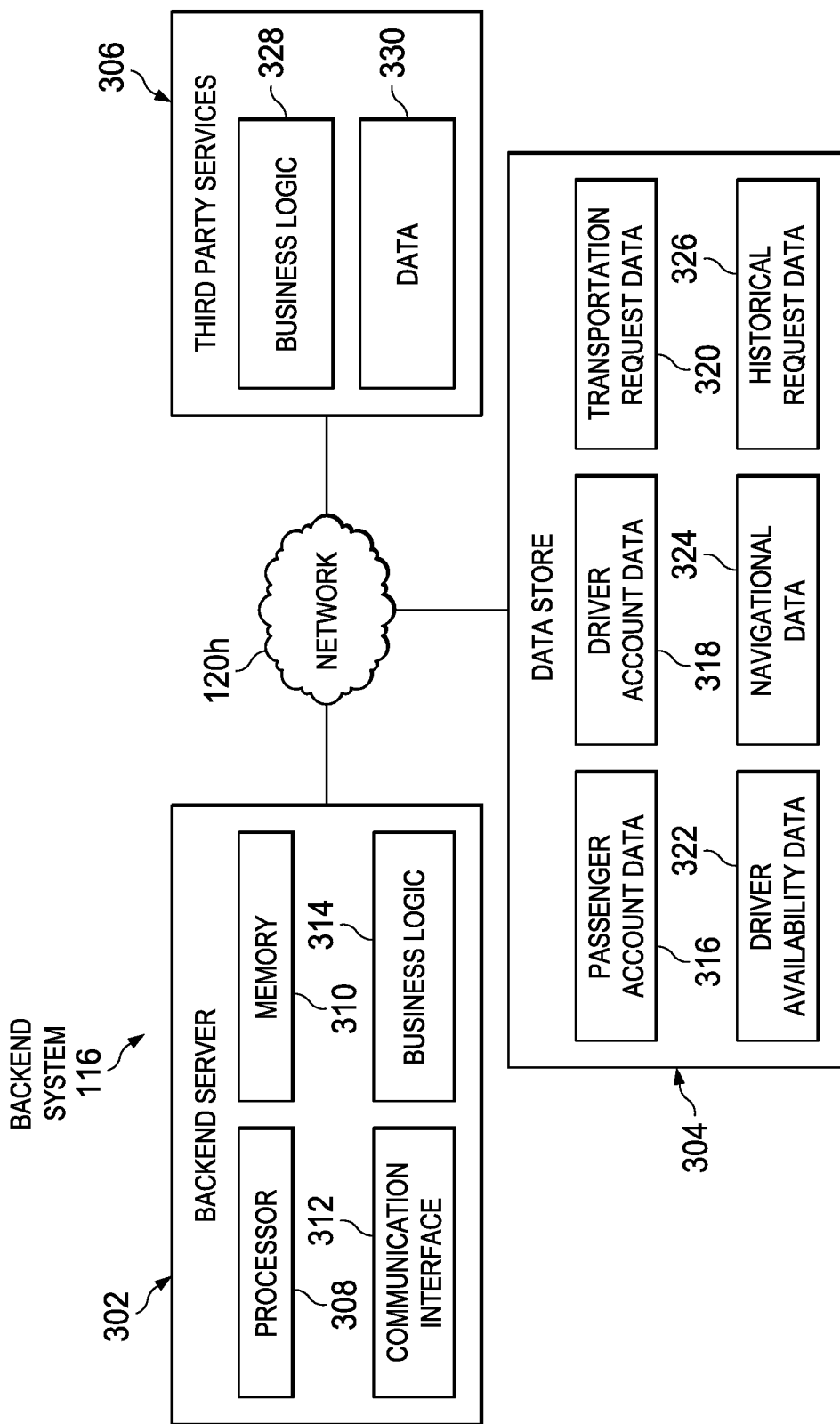
FIG. 3 illustrates a block diagram of a backend system of the system of FIG. 1 in accordance with certain embodiments.

FIG. 3 illustrates a block diagram of a backend system 116 of the system of FIG. 1 in accordance with certain embodiments. Although FIG. 3 depicts a particular implementation of the backend system 116, the backend system may include any suitable devices to facilitate the operation of the transportation service described herein. In the embodiment depicted, backend system includes backend server 302, data store 304, and third party services 306 coupled together by network 120h. In various embodiments, backend server 302, data store 304, and/or third party services 306 may each comprise one or more physical devices (e.g., servers or other computing devices) providing the functionality described herein. In some embodiments, one or more of backend server 302, data store 304, and third party services 306 (or portions thereof) are deployed using a cloud service and may comprise one or more virtual machines or containers.

In the embodiment depicted, backend server 302 includes a computer system to facilitate performance of its operations. As an example, backend server 302 includes one or more processors 308, memory elements 310, and communication interfaces 312, among other hardware and software. These components may work together in order to provide backend server functionality described herein. Processor 308 may have any suitable characteristics of the processors 202 and 204 described above. In particular embodiments, backend server 302 may utilize multiple processors to perform the functions described herein. In various embodiments, reference to a processor may refer to multiple discrete processors communicatively coupled together.

Similarly, memory 310 may have any suitable characteristics of memories 206 and 208 described above. Memory 310 may store any suitable data or information utilized by backend server 302, including software embedded in a computer readable medium, and/or encoded logic incorporated in hardware or otherwise stored (e.g., firmware). Memory 310 may also store the results and/or intermediate results of the various calculations and determinations performed by processor 308.

Communication interface 312 may also have any suitable characteristics of communication interfaces 214 and 216 described above. Communication interfaces 312 may be used for the communication of signaling and/or data between backend server 302 and one or more networks (e.g., networks 120) and/or network nodes (e.g., computing devices 104 and 108, data store 304, third party services 306, and application server 112) coupled to a network or other communication channel.

Business logic 314 may have any suitable characteristics of application logic 218 and 220 described above. Business logic 314 may include logic providing, at least in part, the functionality of the backend server described herein. In a particular embodiment, business logic 314 may include software that is executed by processor 308. However, in other embodiments, business logic 314 may take other forms such as those described above with respect to application logic 218 and 220.

Backend server 302 may communicate with data store 304 to initiate storage and retrieval of data related to the transportation service. Data store 304, may store any suitable data associated with the transportation service in any suitable format(s). For example, data store 304 may include one or more database management systems (DBMS), such as SQL Server, Oracle, Sybase, IBM DB2, or NoSQL data bases (e.g., Redis and MongoDB).

In the embodiment depicted, data store 304 includes passenger account data 316, driver account data 318, transportation request data 320, driver availability data 322, navigational data 324, and historical request data 326. The various data may be updated at any suitable intervals.

Passenger account data 316 may include any suitable information associated with passenger accounts, such as contact information (e.g., real names and addresses), user names and passwords (or other authentication information), payment information (e.g., credit card or bank account numbers and associated information), passenger preferences (e.g., preferred type or color of car), ratings the passenger has given drivers, ratings the passenger has received from drivers, or other information associated with passenger profiles.

Driver account data 318 may include any suitable information associated with driver accounts, such as contact information (e.g., real names and addresses), user names and passwords (or other authentication information), payment collection information (e.g., bank account information), vehicle information (e.g., models and colors of cars the drivers utilize, maximum capacity of the cars of the drivers), merchandise offered by the drivers, whether the drivers are available to transport passengers, whether the drivers have opted for automatic acceptance of transportation requests (whereby the backend server 302 may assign a transportation request to the driver without waiting for the driver to indicate acceptance of a request), or other suitable information.

Transportation request data 320 may comprise pending requests (i.e., requests that have not yet been fulfilled) received from passengers. Each request may include any suitable information, such as any combination of one or more of an identification of the passenger making the request, the time the request was made, the current location of the passenger, the desired pick-up location, the desired pick-up time, the estimated time remaining until a driver can pick up the passenger, the actual pick-up time, the desired destination location of the passenger (which the passenger may or may not provide at the time the request is made), the expected arrival time at the destination location, the type of vehicle requested, estimated fare for the trip, current accumulated fare for the trip, estimated time and mileage remaining in the trip, other information specified by the user (e.g., requested merchandise, requested minimum rating of driver), whether a driver has been assigned to a request, and which driver has been assigned to a request. For each transportation, an appropriate fare may be assigned according to a distance-weighted continuous pricing function as disclosed herein.

Driver availability data 322 may comprise information associated with drivers that are available to transport passengers. In some embodiments, driver availability data 322 may also comprise information associated with drivers that are not available to transport passengers (e.g., because they are off-duty or currently transporting a passenger). An entry in the driver availability data 322 may include an identification of a driver and any suitable associated information, such as one or more of a current location of the driver, whether the driver is available to transport passengers, whether the driver is currently transporting a passenger, a destination location of a current trip of the driver, an estimate of how long it will be before the driver finishes his current trip, whether the driver has opted for automatic acceptance of transportation requests, or other suitable information.

Navigational data 324 may comprise information supporting navigation functions provided by the passenger applications and driver passenger applications. For example, navigational data 324 may comprise map data that may be sent to passenger computing devices 104 and driver computing devices 108 to allow the devices to display maps and associated indicators (e.g., location of passenger(s), location of driver(s), desired routes, etc.). In some embodiments, the navigational data may also comprise information indicative of the amount of time required to travel between various locations. In some embodiments, navigational data 324 may comprise historic and/or real time data about the flow of traffic in particular areas enabling backend server 302 to calculate an estimated time required to travel from one location to another.

Historical request data 326 may comprise information about completed requests. In some embodiments, historical request data 326 may also include information about canceled requests. The information for each request may include any combination of the information listed above with respect to requests stored in the transportation request data 320 as well as any combination of additional data such as the time at which the destination location was reached, the total time of the trip, the total fare, a rating given by the passenger to the driver or by the driver to the passenger for the trip, or other suitable information associated with the trip.

In various embodiments, backend server 302 may access third party services 306 through business logic 328 to access data 330. Third party services 306 may represent any suitable number of devices operated by any suitable number of third parties that are distinct from an entity that operates the backend system 116 and/or data store 304. For example, in some embodiments the navigational data may be obtained from a third party service 306 rather than data store 304, or additional third party navigational data such as map data or historical and/or current traffic flow information may be used to supplement navigational data 324. As another example, third party services 306 may authenticate users on behalf of the backend server 302 (e.g., through an account of the user with the third party). Business logic 328 may comprise any suitable logic operable to receive requests for data from backend system 116 and/or computing devices 104 and 108 and provide responses to the requests.

Backend server 302 may be in communication with each passenger computing device 104 and each driver computing device 108 that is utilizing the transportation service at a particular time. Backend server may store information received from the computing devices 104 and 108 in data store 304. Backend server 302 may also receive and respond to requests made by computing devices 104 and 108 by processing information retrieved from data store 304.

When a passenger opens the passenger application, the backend server 302 may log the passenger in based on a comparison of authentication information provided by the passenger computing device 104 with authentication information stored in passenger account data 316. The passenger may then request a ride. The request is received by the backend server 302 and stored in transportation request data 320. Backend server 302 may access driver availability data 322 to determine one or more drivers that would be suitable to fulfill the request from the passenger. In one embodiment, backend server 302 selects a particular driver (e.g., based on the driver's locality with respect to the passenger's pick-up location) and sends information associated with the request to the driver. The driver indicates whether he accepts or rejects the request via his computing device 108. If the driver rejects the request, backend server 302 selects a different driver and the process is repeated until the backend server 302 receives an accepted request from a driver. In another embodiment, backend server 302 may select a plurality of drivers that may fulfill a transportation request and allow the passenger to select one of the drivers. The backend server 302 may proceed to notify the driver of the request in a similar manner to that described above. In yet another embodiment, backend server 302 may select a plurality of drivers that may fulfill a transportation request and notify each driver of the transportation request. The backend server 302 may then allocate the request to one of the drivers based on any suitable criteria. For example, the driver who is the first to accept the request may be assigned to the request. As another example, if multiple drivers accept the request within a given timeframe, the request may be assigned to the most suitable driver (e.g., the driver that is closest to the pick-up location or a driver that has a car that meets preferred characteristics of the transportation request).

Once the request has been accepted by a driver, the backend server 302 notifies the passenger that a driver has accepted his request and provides any suitable information associated with the driver (e.g., driver's current location, model and color of vehicle, estimated time of arrival, etc.) to the passenger.

The backend server 302 may provide navigation information (e.g., the passenger's current location or other pickup location and directions to the current location or other pickup location) to the driver computing device 108 to direct the driver to the passenger's pickup location and subsequently to direct the driver to the passenger's destination location. The backend server 302 may also provide real-time updates associated with the trip to both the passenger and the driver.

Once the passenger's destination location has been reached, the backend server 302 may facilitate payment of the fare for the trip using payment information stored in passenger account data 316 and/or driver account data 318 (or information supplied by the passenger at the time of the transaction). The backend server 302 may also receive ratings associated with the trip for the passenger and driver and store these ratings in data store 304.

Figure 5:
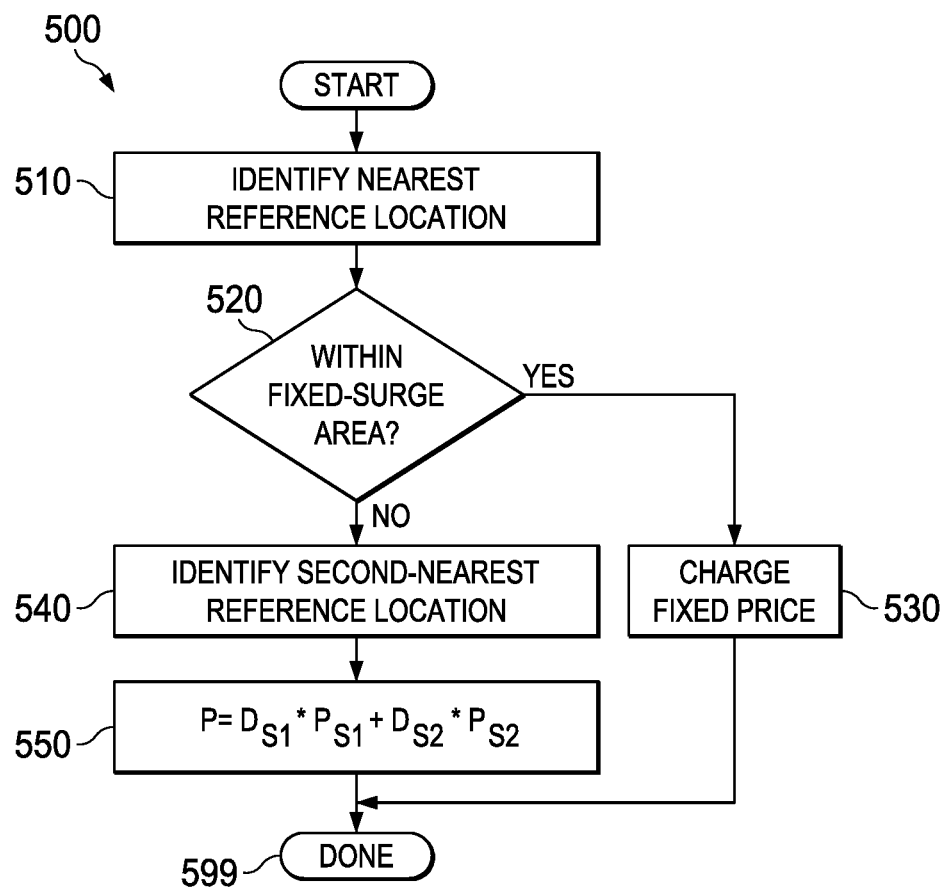
FIG. 5 is a flow chart illustrating a method in accordance with certain embodiments.
Figure 6:
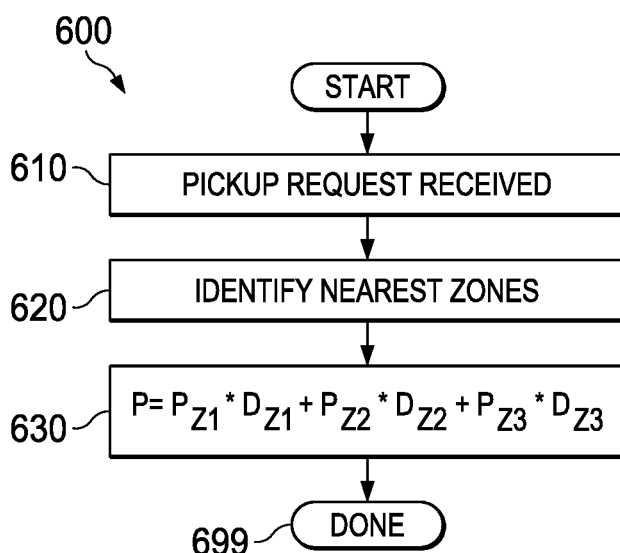
FIG. 6 is a flow chart illustrating a method in accordance with certain embodiments.

Backend server 302 may also be configured to provide a distance-weighted continuous pricing function, as disclosed in more detail in connection with FIG. 5 and FIG. 6.

Figure 4:
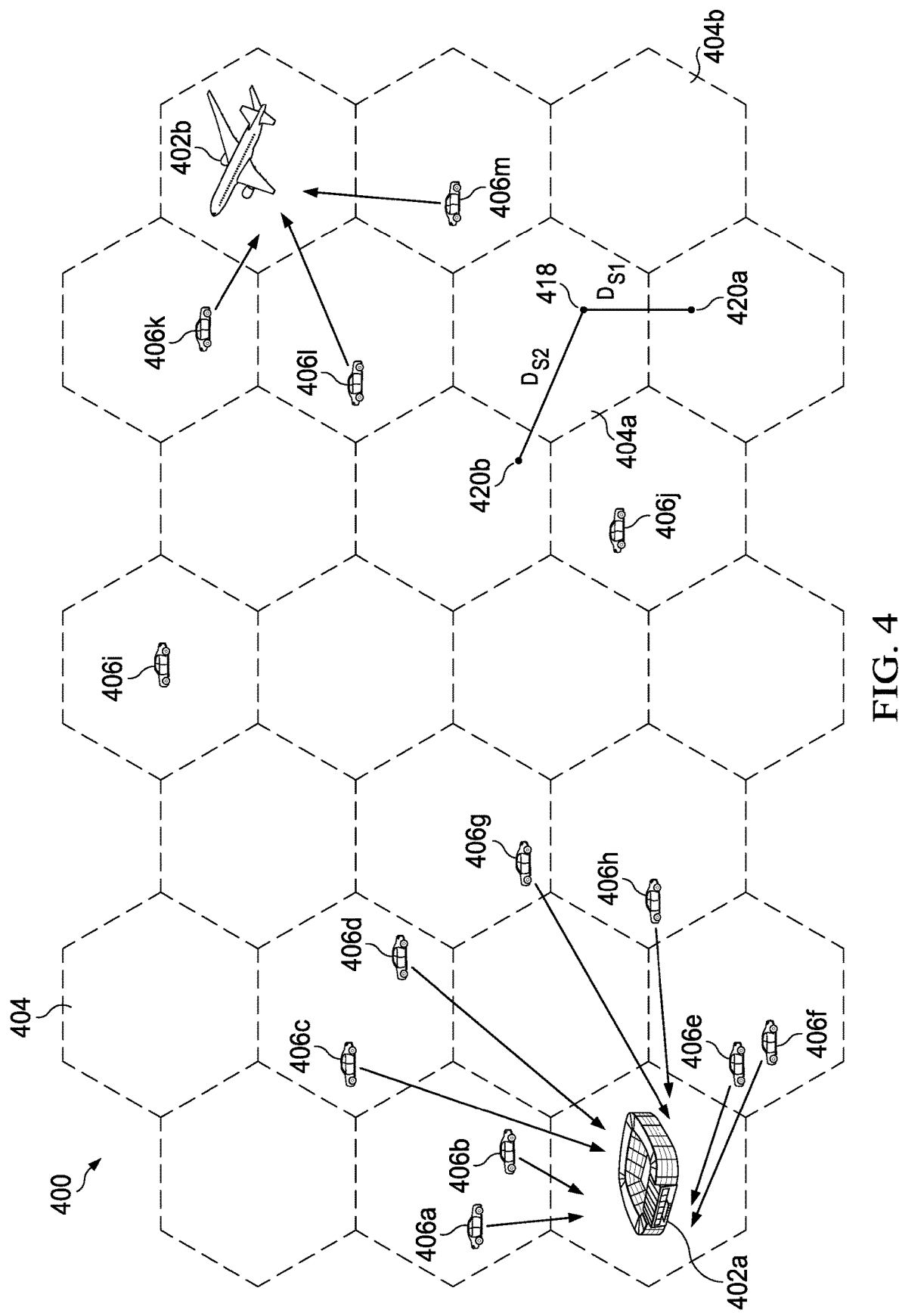
FIG. 4 illustrates a plurality of zones and reference locations in accordance with certain embodiments.

FIG. 4 illustrates a diagram of various driving zones 404 in accordance with certain embodiments. Although the zones 404 are depicted as hexagonal regions each having the same area, other embodiments may include zones with any suitable geographical delineations. In the embodiment depicted, drivers 406 are located in various regions or zones 404. Diagram 400 also depicts event locations 402a and 402b which are the sites of a football game and an arrival of an airplane.

In various embodiments, drivers 406 may be preemptively directed by the backend server 302 to various event locations such that the drivers may be waiting at the event locations when requests from passengers attending the events are received. In the embodiment depicted, drivers 406a-h are directed to wait in separate locations (e.g., the four corners of the football stadium) at the event location to facilitate efficient pairing of passenger requests with the drivers. In various embodiments, drivers to be preemptively directed to an event may be selected based on their proximity to the event location. For example, in the embodiment depicted, drivers 406a-406h are directed to event location 402a, drivers 406k-m are directed to event location 402b, and drivers 406i and 406j are not directed to an event location.

FIG. 4 also illustrates an issue that may be encountered in certain pricing models. In the example of FIG. 4, a user is at location 418, and wants to be picked up. The passenger may submit a transportation request via passenger computing device 104. Backend server 302 determines the location of 418 based on the request, and in certain systems, may determine which of a plurality of zones 404 location 418 is in. In this case, location 418 is in zone 404a.

In some existing systems, each zone 404 may have its own separate pricing scheme for rides originating from the zone. A price used by the pricing scheme may be, for example, an absolute price, or it may be a multiplier of a baseline or default rate normally charged for rides originating from the zone (referred to herein as a "surge price", "pricing factor", or "surge multiplier"), which in some embodiments may be a regional baseline applicable to multiple zones 404 (e.g., the baseline for Kansas City, MO may be different from the baseline for New York, NY, which may be different from the baseline for Los Angeles, CA). If the price is a multiplier, it may be expressed in a form such as 1.05× (for a zone with near-baseline demand), 1.3× (for a zone with slightly elevated demand), 3.2× (for a zone with very high demand), or 0.85× (for a discounted zone, such as a zone that is a target of a promotion, or a zone that is in low demand). The price for each zone may be recalculated periodically at any suitable interval, such as every two minutes, to respond to changes in supply and demand, or other relevant factors such as traffic, weather, or road conditions.

As discussed above, in the depicted embodiment the zones are of substantially identical and regular shape and size, but this is a nonlimiting example only. In some cases, the size and shape of zones may vary greatly. For example, a zone may be drawn around airport 402b, and may only include the airport and its immediate surrounding areas. Other zones may be drawn around much larger geographic areas because they do not contain a point of such specific interest. These other zones may be less expensive because they are in less demand.

An issue may be encountered when a location, such as location 418, is very near the boundary of a zone. In some cases, the pricing rates or models of two different zones are substantially different. For example, zone 404a may be a premium zone with a much higher rate, while adjacent zone 404b may be a less popular zone with a much lower rate. Thus, if a user at location 418 can determine that a zone boundary is nearby, and can determine that the adjacent zone is much less expensive, he may be able to "game" the pricing model by walking a short distance to zone 404b. In certain embodiments, this pricing differential may not accurately reflect the fact that the user has moved only a very short distance, and that there is little substantial difference between his starting location and his ending location. In some extreme cases the user may even just need to move to the other side of the street to get into a new zone with a completely different pricing model.

Thus, according to certain embodiments, it may be preferable to provide a distance-weighted continuous pricing function. A distance-weighted continuous pricing function may eliminate precipitous changes in price that occur at zone boundaries by instead providing a continuously-variable price gradient between two reference points.

In a general sense, a distance-weighted continuous pricing function identifies two or more reference locations, where each reference location includes its own price, and computes a distance-weighted average of the two prices. The distance weighting gives greater weight to the nearer reference location(s), and lesser weight to farther reference locations.

In one nonlimiting example, rather than divide a geographic region into discrete zones, a plurality of reference locations are instead defined. Each reference location may be a "surge area," of intense interest. In general, prices may tend to spike around surge areas because they are popular areas.

In this embodiment, two surge areas are identified, namely surge area 420a and surge area 420b. In this example, the zone boundaries may be ignored. Instead, when a user at location 418 requests a pickup, backend server 302 may identify a surge area 420a as the nearest reference location, and surge area 420b as the second-closest reference location. Each reference location may have associated therewith a price or pricing model. The price may depend not only on the location, but on other factors disclosed herein, such as the number of drivers in the area, number of passenger requests from the area, time of day, traffic conditions, road conditions, weather, or other relevant factors. In this case, backend server 302 may compute a reference price for reference location 420a, and a price for reference location 420b. In each case, the price may be the price a user would be charged if requesting pickup directly at the reference location 420. In some cases, the price may be measured as a difference factor, or in other words a multiplier of a standard or baseline transportation rate. Note that this reference price may be continuously or periodically recalculated based on supply, demand, traffic, and other factors. For example, the reference price may be recalculated approximately every two minutes.

Next, backend server 302 may compute a distance to each reference location 420a. Backend server 302 may then weight the price for each location 420 based on the distance from pickup location 418 to that reference location 420. Thus, location 420a will have a greater influence on the price, because it is closer to pickup location 418. Reference location 420b may have a lesser influence, reflecting the fact that it is further from pickup location 418.

One example of weighting is to compare each distance to its percentage of the total distance. For example, the distance from location 418 to reference location 420a may be designated $d_{420a}$. Similarly, the distance from location 418 to reference location 420b may be designated $d_{420b}$. The total distance of the path may be represented as $D=d_{420a}+d_{420b}$. The weighting factor may thus be computed as follows:

$$W_{420a} = 1 - \frac{d_{420a}}{D} \cdot W_{420b} = 1 - \frac{d_{420b}}{D}.$$

This formula weights each distance according to its share of the total distance, subtracted from 1 so that closer distances are weighted more. Note however that this accounts only for the share of distance. Optionally, it may also be desirable to adjust the overall price based on the total value of D. In other words, if D=20 miles, the price may be adjusted downward relative to a situation where D=5 miles. In some cases, a minimum "floor" price may also be established. In some embodiments, the need for price adjustment may be mitigated simply by defining additional reference points with appropriate pricing for each, including reference points that are not "premium" pricing areas.

Use of the distance-weighted continuous pricing function ensures that there are no precipitous price changes. Rather, as a user approaches nearer to reference location 420a, the price more nearly approaches the reference price of 420a. As the user more nearly approaches 420b, the price more nearly reflects the reference price of 420b. If the user is halfway between 420a and 420b, he may pay a price that is a mathematical average of the two reference prices, which in some embodiments may be adjusted downward if the total distance is large.

This distance-weighted continuous pricing model may be backward compatible with a zone-based pricing system. However, in this example, rather than precipitously charge a different price whenever the user crosses a zone boundary, the price difference between two zones may be a continuous gradient between the midpoints of the two zones. This may be considered a special case of the method described above, wherein the reference points rather than being necessarily geographic interest points, are instead center points of each zone. Thus, in this example, the user's location 418 is in zone 404a. The next-nearest zone is zone 404b. When the user requests a pickup at location 418, the center points of each zone are used as the reference locations in the equation above. Thus, backend server 302 computes a distance from location 418 to the center of zone 404a. Backend server 302 also computes a distance from location 418 to the center point of zone 404b. As before, the price for each zone is weighted according to the user's distance from the center of that zone.

It should be noted that the center point of the zone need not be necessarily the exact geographic center of the zone. The center of the zone may itself be weighted according to other factors, such as population density, industry, locations of interest, or other factors. Thus, when the center point of the zone is spoken of, it should be understood to be any center point of the zone identified by backend server 302, whether or not it is the exact geographic center of the zone.

The foregoing examples use only two reference points to compute a distance-weighted continuous pricing function. However, additional points may be used. For example, if pickup location 418 is nearly the same distance to both zone 404b and some other zone, then the center points of all three zones may be used to compute the pricing model. In this case, the total distance D is the sum of distances from location 418 to the three center points. Again, because the pricing is distance weighted, a continuous gradient may be observed as the user moves between these points.

In yet another example of zoneless pricing, a plurality of reference points, such as three or more reference points, are grouped within a larger geographic area or a radius, such as a radius between 10 or 20 miles. A distance to each reference point within that area or radius may be computed from pickup location 418. In that case, the pricing models of every reference location in the larger geographic area influences the price, but those that are much further away have a much smaller influence on the price, while those that are closer have a much greater influence on the price.

It should also be noted that the "distance" from pickup location 418 to any reference location may be computed by any suitable method. For example, the distance may be the distance "as the crow flies," (the direct linear distance), or it may be the driving distance, taking into account an estimated best driving route.

In some embodiments, an area around a reference location (e.g., a small radius) to provide a "fixed surge area." As one example, a fixed surge area could be a zone as described herein. Any pickup location 418 within the fixed-surge area will be charged a price based on a uniform fixed surge multiplier. The uniform fixed price may be identical to the price for the reference location itself. As the user moves outside of the fixed-surge area (e.g., in between fixed-surge areas), pricing models of other reference locations may begin to exert an influence on the price charged. It should be noted that this "fixed" price need not be universally fixed, but may rather be instantaneously fixed, and may be recalculated at regular intervals, such as every two minutes, based on supply and demand.

In some cases, the fixed-surge area may be influenced by points of interest. For example, if the reference location is an airport, then the fixed-surge area may include the airport itself and immediately surrounding areas, such as long-term parking locations that service the airport. These all may receive a uniform price, while areas outside of the fixed-surge area may receive a price influenced by other surrounding reference points (including reference points in other fixed surge areas). It should be noted that the fixed-surge area need not necessarily be an exact circular or geometric radius. Rather, in some examples, the fixed-surge area may be of an irregular shape, and be defined by artificial boundaries, such as the shape of an airport and its supporting services.

Accordingly, rides with pickup locations within a zone may be subject to a fixed price (e.g., a surge multiplier) associated with the zone (thus the price would be fixed within each zone), but for locations in between zones (i.e., not in any specific zone), a price may be calculated using a distance-weighted continuous pricing function. For a particular location outside of any zone, the price may be weighted based on the distance from the pickup location to each zone and the price of each zone. In various embodiments, the distance may be between the pickup location and any suitable location of the zone. For example, the distance may be the distance between the pickup location and the nearest boundary of a zone. As another example, the distance may be the distance between the pickup location and the center of a zone.

FIG. 5 is a flowchart of a method 500 performed by a backend server 302 according to one or more examples of the present specification. The example of method 500 includes an example wherein reference locations are employed, and may be agnostic of the concept of fixed pricing "zones."

In block 510, when a user requests pickup at a pickup location, such as location 418, backend server 302 identifies the nearest reference location, such as a surge point, or other reference location.

In decision block 520, backend server 302 determines whether the pickup location is within a fixed-surge area, including an irregularly shaped fixed-surge area.

In block 530, if the pickup location is within the fixed-surge area, then backend server 302 assigns the fixed-price for the reference location as the price to be charged.

On the other hand, if the pickup location is not within the fixed-surge area, then in block 540, backend server 302 may identify one or more next-nearest reference locations. As discussed above, the pricing may be distance-weighted between only two points, or between three or more points.

In block 550, backend server 302 computes an appropriate price P according to the formula $$P = \sum_{n=1}^{t} P_{Sn} * D_{Sn},$$

where P is the price to be charged, t is the total number of reference points, $P_{Sn}$ is a reference price (e.g., surge multiplier) at reference location Sn, and $D_{Sn}$ is a function of the distance from the pickup location to reference location Sn. In various embodiments, if the pickup location is the same as one of the reference locations Sn, then $P=P_{Sn}$.

When only two reference locations are used, $P=D_{S1}*P_{S1}+D_{S2}*P_{S2}$, where:

P is the price to be charged.
S1 is the first reference location.
S2 is the second reference location.
$D_{S1}$ is a function of the distance from the pickup location to the first reference location.
$P_{S1}$ is the reference price at location S1.
$D_{S2}$ is a function of the distance from the pickup location to S2.

$D_{Sn}$ may be calculated in any suitable manner. In one example, $$D_{Sn} = \frac{\frac{1}{(d_{Sn})^k}}{\sum_{n=1}^{t} \frac{1}{(d_{Sn})^k}}$$

where k is any suitable constant (e.g., 1, 2, 3, or other value). In another example, $$D_{Sn} = 1 - \frac{d_{Sn}}{D},$$

where $d_{Sn}$ is the distance from the pickup location to reference location $S_n$ and D equals the sum of distances from the pickup location to the reference locations 418 (i.e., $$\sum_{n=1}^{t} d_{Sn})$$

Note that the example of block 550 shows a formula where only two reference locations are considered. However, in other embodiments, three or more reference locations may be considered, with each reference location weighted by its distance to the pickup point.

By way of a nonlimiting example, a user is at location 418, which is 0.5 miles from reference point 420a, and 1.5 miles from reference point 420b. Reference point 420a is a moderately popular location with a pricing factor of 1.3 times the baseline rate, while 420b is an extremely popular destination with 3.2 times the baseline rate. The pricing factor for a passenger at location 118 is thus $$P = \left(1 - \frac{0.5}{2.0}\right) * 1.3 + \left(1 - \frac{1.5}{2.0}\right) * 3.2 = 0.75 * 1.3 + 0.25 * 3.2 = 1.775.$$

So a user at location 418 is charged 1.775 times the baseline rate, accounting for his relative proximity to both 420a and 420b. As above, note that 1.3× and 3.2× are essentially instantaneous rate multipliers, which may be recalculated regularly, such as every two minutes, based on appropriate factors such as demand, weather, and traffic.

This formula is provided as a nonlimiting example only, and it should be noted that any other suitable function, including any suitable averaging function, may be used. In various embodiments, any suitable inverse distance weighting functions (such as Shephard's Method, a modified Shepard's Method, a Lukaszyk-Karmowski metric, or other inverse distance weighting function) may be used (e.g., by backend server 302) to calculate the price to be charged (e.g., the surge multiplier to be applied to the ride).

In block 599, the method is done. It should be noted that any other suitable continuous function, including any suitable averaging function, may be used in place of the foregoing.

FIG. 6 is a flowchart of a method 600 of providing zone-base distance-weighted continuous pricing according to one or more examples of the present specification.

Figure 7:
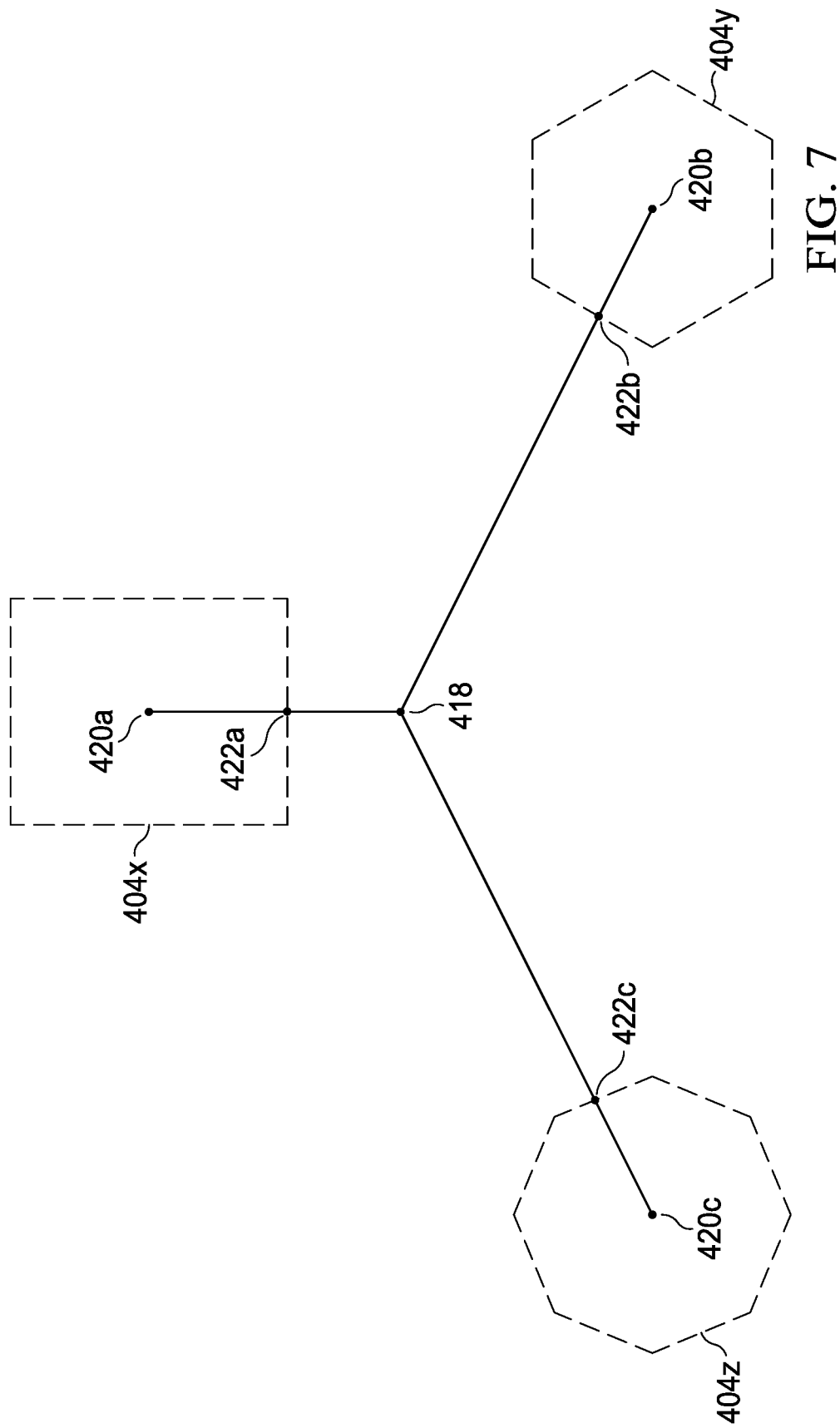
FIG. 7 illustrates a plurality of zones and a passenger pickup location without the zones in accordance with certain embodiments.

In block 610, a pickup request for a location such as location 418 shown in FIG. 7 is received. Backend server 302 determines that the location is not in a zone (e.g., the location lies outside of zones 404x, 404y, and 404z). Each of the zones may have their own instantaneous fixed rate, which may be a multiplier of a baseline rate (i.e., a surge multiplier). For example, the rate for zone 404x may be 1.3×, the rate for zone 404y may be 3.2×, and the rate for zone 404z may be 2.7×.

In block 620, backend server 302 identifies the nearest zones (e.g., 404x, 404y, and 404z).

In block 630, using the nearest boundary points of the three zones as reference locations, backend server 302 computes a distance-weighted price based on the pickup location's distance to each boundary location 422 (e.g., according to the formula listed above). Thus, $P=P_{404x}*D_{404x}+P_{404y}*D_{404y}+P_{404z}*D_{404zy}$ where:

P is the price to be charged.
$P_{404x}$ is the price for zone 404x.
$D_{404x}$ is a function of the distance from the pickup location 418 to the nearest boundary location 422a of zone 404x.
$P_{404y}$ is the price for zone 404y.
$D_{404y}$ is a function of the distance from the pickup location 418 to the nearest boundary location 422b of zone 404y.
$P_{404z}$ is the price for zone 404z.
$D_{404z}$ is a function of the distance from the pickup location 418 to the nearest boundary location 422c of zone 404z.

In various embodiment, each function of the distance (i.e., $D_{404x}$, $D_{404y}$, and $D_{404z}$) may be calculated as $$D_{Sn} = \frac{\frac{1}{(d_{Sn})^k}}{\sum_{n=1}^{t} \frac{1}{(d_{Sn})^k}}$$

as described above (or other suitable distance weighting function), substituting in the boundary locations 422a-c for the reference locations (thus each ds, would be the distance between the pickup location and one of the boundary points).

Again, although three zones are used in the specific example, two or more zones could be used in other embodiments. In this case, all of the zones in a certain geographic area or radius may influence the pricing model, with closer zones influencing it more, and more distant zones influencing it less.

In block 699, the method is done.

As illustrated in FIG. 7, fixed-price zones 404 may be defined around surge points 420, with a fixed-price radius around each. In this case, zones 404*x*, 404*y*, and 404*z* are defined around surge points 420*a*, 420*b*, and 420*c* respectively. Passenger location 418 is outside of any zone 404.

Thus, the price for a trip from passenger location 418 may be calculated as a function of the distance to the boundary location (or other location, e.g., surge point) of two or more nearby fixed-price zones.

It should also be noted that other formulas are possible. For example, rather than using two or more reference zones, a single reference zone or location could be used, with a simple linear distance-based multiplier, where the multiplier varies inversely with the distance from the reference. For example, if location 420*b* is used, with a multiplier of 3.2×, then very near 420*b*, the multiplier is very near 3.2×. As the distance from 420*b* increases, the multiplier falls off, linearly, or with another relationship such as with the square of the distance, until it reaches a floor such as the baseline rate.

It is important to note that the operations in FIGS. 5-6 illustrate only some of the possible scenarios that may be executed by, or within, the various components of the system described herein. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion.

Figure 8:
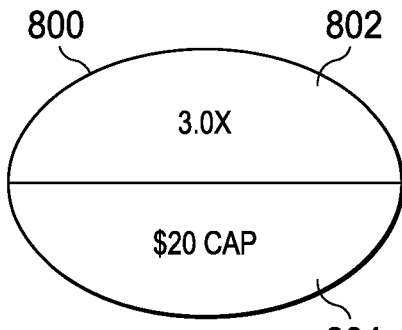
FIG. 8 illustrates a portion of a user interface displaying a surge multiplier and a surge cap in accordance with certain embodiments.

FIG. 8 depicts an example portion of a user interface 800 that may be displayed by a passenger computing device 104. Interface 800 displays a surge multiplier 802 and a surge cap 804 associated with a transportation request. The user interface 800 may be displayed to a passenger in connection with a request for transportation made by the passenger. For example, the user interface 800 may be displayed in response to the passenger submitting one or more parameters (e.g., a pickup location and/or a destination location) associated with a transportation request to the backend server 302.

As described above, a surge multiplier may be calculated for a transportation request based on current supply of drivers and demand of passengers and/or other factors. One issue with assigning a single multiplicative factor to a transportation request is a perceived lack of fairness toward passengers requesting relatively long trips. If a single surge multiplier is applied to a trip based on the surge pricing at the passenger pickup location and the passenger pickup location has a relatively high surge multiplier, this surge multiplier may continue to be applied during a portion of the trip that travels through a zone or other location that has a lower surge multiplier (or a zone in which surge pricing is not applicable, in which case the surge multiplier would have a value of one). In such cases, it may be beneficial for a passenger to make one transportation request to a location outside of a surge zone, exit the vehicle, and make another transportation request to the final destination (such that a high surge multiplier is not applied to a baseline travel rate during the entire trip). While it may be inconvenient to replace the transportation vehicle during the ride, the significant price difference may incentivize the passenger to do so in spite of the time incurred switching vehicles.

In various embodiments of the present disclosure, a surge cap is associated with a transportation request. The surge cap limits the amount of the ride that is subject to surge pricing, resulting in a fairer price to the passenger. Until the surge cap is reached, surge pricing applies to the fare, but once the surge cap is reached, default rates are replied for the remainder of the trip. Such a scheme may provide passengers taking short trips with the standard surge pricing (since a surge cap may be set high enough that short rides are unlikely to meet the surge cap), but place a ceiling on the surge surcharge that a passenger is to pay for a longer trip.

The surge cap presented to the user may take any suitable form, but in any event represents a maximum amount of a fare for the transportation request that is subject to a surge pricing surcharge. For example, the surge cap may represents a maximum amount of the total fare that may be calculated by applying the surge multiplier (or multiple surge multipliers). For example, if a surge multiplier for a transportation request is 3.0× and the surge cap is $30, then the fare will accumulate at a rate of 3× the normal rate until the accumulated fare reaches $30, at which point the fare will accumulate at the default rate. As another example, the surge cap may represent a maximum amount of a surcharge due to surge pricing. For example, if a surge multiplier is 3.0× and the surge cap is $20, then the fare will accumulate at a rate of 3× the normal rate until the surcharge due to the surge pricing reaches $20, at which point the fare will accumulate at the default rate. In this example, the surcharge due to the surge pricing is 2.0× the normal fare (since the surge multiplier is 3.0×), and thus this surge cap is equivalent to the surge cap of the previous example in which the surge cap was $30 but was applied to the total fare (and not just to the amount representing the surcharge).

In various embodiments, the surge cap is determined by the backend server 302 based on one or more surge multipliers. A surge multiplier 802 may be determined based on any of the factors or methods described above. In a particular embodiment, each zone 404 of multiple different zones is associated with its own surge multiplier. In a particular embodiment, backend server 302 determines the surge multiplier for a zone based on supply (of drivers) and demand (e.g., a rate of passenger requests with pickup locations in or near the zone).

The indications of supply may be based on historical and/or current data accessible by backend server 302 about the number of drivers located (or expected to be located) in the zone or otherwise available to fulfill transportation requests with pickup locations within the zone (e.g., the indication of supply may be based on the number of drivers in neighboring zones and/or within a certain distance or driving time of one or more locations of the zone) or other suitable information. The indications of demand may be based on the number of pending transportation requests within the zone (and/or neighboring zones), the number of transportation requests received over a particular time interval with a pickup location in the zone (and/or neighboring zones), the number of transportation requests expected to be received for a particular time interval (in the zone and/or neighboring zones), and/or other suitable information.

The surge multiplier for a zone may be updated dynamically based on changes in supply and demand. For example, the surge multiplier may be updated periodically (e.g., every 2 minutes, every 5 minutes, or at any other period interval) or in response to an event (such as a rapid change in demand or supply). In various embodiments, when the surge multiplier is updated, if the amount of demand exceeds the amount of supply (or the demand to supply ratio has increased relative to the last calculated demand to supply ratio), then the surge multiplier for the zone may increase. Conversely, if the amount of supply exceeds the amount of demand (or the demand to supply ratio has decreased relative to the last calculated demand to supply ratio), the surge multiplier may decrease.

In various embodiments, updates for a plurality of zones are updated concurrently at a periodic interval. In other embodiments, zones may be updated successively at a periodic interval. For example, a particular zone (e.g., the zone receiving the most travel requests or a zone selected based on other suitable criteria) may be updated first, followed by neighboring (or other) zones. In various embodiments, the order in which the zones are updated is based on the surge multipliers of the zones, the number of requests being received at the zones, or other suitable information.

In various embodiments, the surge cap may be determined based on any suitable factors, such as a surge multiplier of a zone or surge area (e.g., a single location associated with a surge multiplier), surge multipliers of multiple zones or surge areas, a pickup location of a transportation request, a destination location of a transportation request, a transportation history of a passenger, the time of day, the day of the year, or any other suitable factors. In particular embodiments, the surge cap is independent of the destination location (e.g., the destination location may not be available when the surge cap is calculated or the destination location is available but not used to calculate the surge cap). In other embodiments, the surge cap is based at least in part on the destination location.

In a particular embodiment, a surge cap for a transportation request is determined by multiplying a surge multiplier of a zone that includes the pickup location by another parameter, such as an average cost of transportation requests having a pickup location in the zone (in some embodiments surge pricing effects may be removed from the transportation requests when calculating the average cost). In one example, this could involve determining the average trip size for transportation requests from the zone and multiplying by a standard mileage and/or time rate. In another example, this could be a simple averaging of the costs of transportation requests from the zone (discounting any applied surge pricing of the costs). In another embodiment, the parameter may represent an average or expected cost to exit the zone. For example, the parameter may be an average cost (with surge pricing effects removed) of transportation requests from the pickup location or one or more nearby locations to one or more locations near one or more boundaries of the zone or an estimated baseline cost to travel from the pickup location to a boundary of the zone (e.g., the nearest boundary or a boundary of the zone that lies on the route between the pickup location and the destination location of the transportation request), or other suitable parameter. In some embodiments, the cost to get out of the current zone may be added to the cost to get out of one or more adjacent zones in order to obtain the parameter that is multiplied by the surge multiplier in order to calculated the surge cap. The transportation requests used in these calculations to estimate or average a cost may include all stored historical transportation requests or a filtered subset of historical transportation requests (e.g., outliers with very low or very high costs and/or old transportation requests may or may not be included in the calculations).

In a particular embodiment, a surge cap for a transportation request is determined based on surge multipliers of multiple zones or surge areas. In one example, an aggregate surge multiplier for a particular zone or surge area may be determined and then multiplied by another parameter (such as any of the parameters described in the paragraph above or other suitable parameter) to determine the surge cap. An aggregate surge multiplier may be based on the surge multiplier of the particular zone or surge area (in combination with the surge multiplier(s) of one or more neighboring zones or nearby surge areas). In a particular embodiment, the aggregate surge multiplier may be determined as an average of the surge multiplier of the particular zone or surge area and the surge multiplier(s) of the neighboring zone(s) or surge area(s). In another embodiment, the aggregate surge multiplier may be determined as a weighted average of the surge multiplier of the particular zone or surge area and the surge multiplier(s) of the neighboring zone(s) or surge area(s). In one example, the surge multiplier of the particular zone or surge area may be weighted more heavily than the surge multiplier(s) from the neighboring zone(s) or surge area(s). In various embodiments, the weights of the neighboring zone(s) may be based on the distance of one or more locations (e.g., the center of the zone) of the neighboring zone(s) relative to one or more locations (e.g., the center of the zone) of the particular zone. In various embodiments, the weights of the neighboring surge area(s) may be based on the distance of surge area(s) relative to the particular surge area.

In various embodiments, the surge multiplier for a transportation request may simply be the surge multiplier for the zone in which the pickup location of the transportation request is located (or the surge area nearest the pickup location), but the surge cap is set to a value that is less than the baseline cost for the transportation request times the surge multiplier (or the surge multiplier minus one when the surge cap tracks only the surcharge amount).

Figure 9:
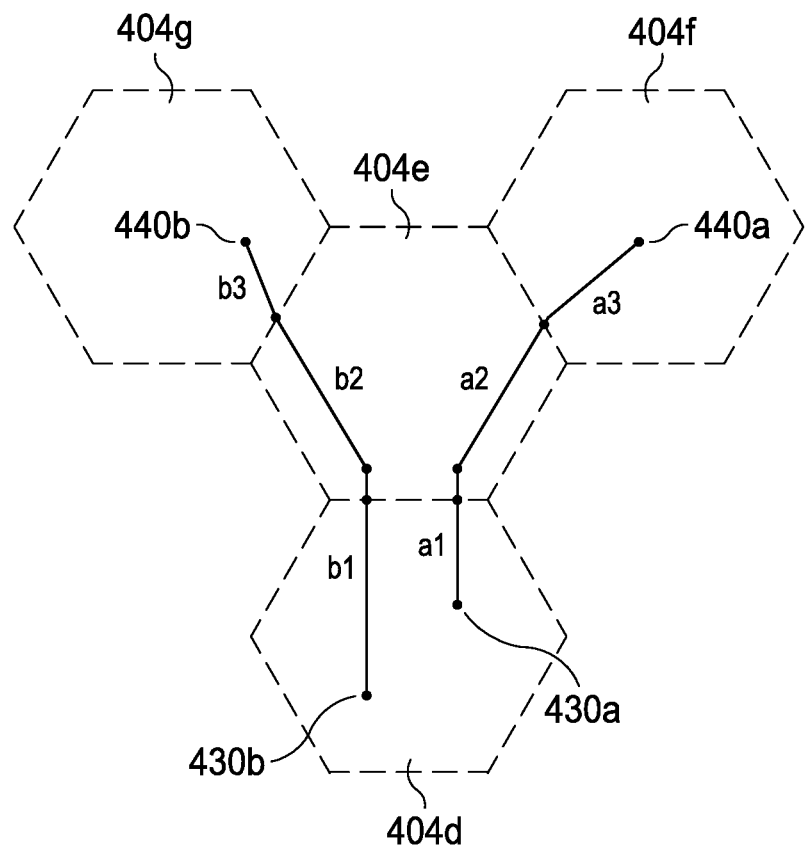
FIG. 9 illustrates a plurality of routes that pass through a plurality of zones in accordance with certain embodiments.

In a particular embodiment, a surge cap for a transportation request is determined based on surge multipliers of multiple zones that lie within a route from the pickup location of a transportation request to the destination location of the transportation request. Referring to FIG. 9, two routes traversing multiple zones 404 are depicted. A first route has a pickup location 430a and destination location 440a and a second route has a pickup location 430b and destination location 440b. The first route traverses zones 404d, 404e, and 404f while the second route traverses zones 404d, 404e, and 404g. Each route is broken up into multiple legs, with each leg associated with a particular zone 404. The first route includes legs a1, a2, and a3 while the second route includes legs b1, b2, and b3. Each leg may be characterized by an expected travel distance, expected travel time, some other metric that is generally used by the transportation system to calculate a base fare, and/or a combination thereof.

In one example, a surge cap may be determined by aggregating expected surge costs across multiple zones 404 of a route, where a surge cost for a particular zone represents the expected surge adjusted cost for travelling the leg of the trip that is located within the particular zone. As an example, a surge cap for the first route may be calculated by aggregating expected surge costs associated with travel through zones 404d, 404e, and 404f; and a surge cap for the second route may be calculated by aggregating expected surge costs associated with travel through zones 404d, 404e, and 404g. In one example, the expected surge cost for a zone may be calculated by multiplying the estimated base fare for the leg by the surge multiplier for the zone (or multiplying the surge multiplier minus one times the estimated base fare if the surge cap is expressed in terms of the surge surcharge rather than the total fare).

Thus, in some embodiments, the surge cap (C) may be expressed as, as $$C = \sum_{n=1}^{t} SM_{Zn} * BF_{Zn},$$

where the route crosses through t total zones, $SM_{Zn}$ is the surge multiplier for a zone n, and $BF_{Zn}$ is the base fare for the leg of the route that is in the zone n. In other embodiments, the contribution of one or more of the legs to the surge cap may be weighted such that $$C = \sum_{n=1}^{t} W_{Zn} * SM_{Zn} * BF_{Zn},$$

where $W_{Zn}$ is the weight of the leg that passes through zone n.

A similar methodology could be used to determine the surge cap based on the average trip size when the destination location is unknown. For example, the surge cap may be calculated by aggregating surge costs associated with a trip through one or more zones (which may each have their own surge multipliers), wherein the trip has a length (e.g., 5 miles) equal to an average trip length from the originating zone. In various embodiments, multiple trip directions and their expected aggregated surge costs could be factored into the determination of the final surge cap. As one example, the aggregated surge costs may be weighted based on the likelihood of a transportation request being in a particular direction. For example, if eighty percent of the transportation requests from a particular zone had a destination north of the zone, the aggregated surge cost calculated based on a trip going north may be weighted more heavily than aggregated surge costs of trips going in different directions.

In various embodiments, any of the distance-weighted continuous price functions described herein may be used as a basis to calculate a surge cap and/or multiplier for a transportation request. For example, an expected cost of a trip may be calculated according to a distance-weighted continuous price function and the expected cost may be used to determine a surge cap and/or multiplier for the trip. In one example, the expected cost may be used to calculate an average surge multiplier that should be applied over the entire trip and the expected cost may be set as the surge cap. In another example, the surge multiplier may be higher than an average surge multiplier for a first leg, but the surge cap may be set such that the surge multiplier times the baseline fare for the first leg plus the baseline fare for the remainder of the trip is equal to the expected cost calculated using the distance-weighted continuous price function.

In various embodiments, a surge cap may be based on one or more factors, such as the loyalty of the passenger (as indicated by a history of transportation requests made by the passenger), the time of day, or the day of year. For example, in some embodiments one or more thresholds that define a passenger's loyalty may be defined based on, e.g., a number of rides taken by the passenger, an amount of miles traveled by the passenger, a gross amount paid by the passenger for transportation requests, other suitable factor, or any combination thereof. The surge cap may be determined based at least in part on which threshold of loyalty the passenger has achieved. As one example, a surge cap may be associated with each threshold. For example, the most loyal passengers may be subject to a maximum surge cap of $10 for any ride, the next most loyal passengers may be subject to a maximum surge cap of $15 for any ride, and so on. As another example, the threshold may be used to determine an adjustment to a surge cap that is calculated according to any of the embodiments described herein or in any other suitable manner. For example, a calculated surge cap may be discounted by a percentage (e.g., 20%, 15%, or 10%) or absolute amount (e.g., $10, $5, or $2.50) based on the threshold of loyalty reached by the passenger in order to determine the surge cap that is presented to the passenger.

In various embodiments, the surge multipliers may be based on the time of day or the day of the year (e.g., the surge multipliers may be higher during rush hour where the demand from passengers increases or on holidays where the supply of drivers shrinks). Accordingly, surge caps which are calculated based on the surge multipliers may also be based on the time of day or the day of the year.

In various embodiments, the surge multiplier and/or surge cap may be communicated by the backend server 302 to a passenger computing device 104 for display by the passenger application logic 218. The surge multiplier and/or surge cap may be communicated in response to a request from the passenger computing device 104 (e.g., a request seeking information associated with a transportation request or the actual transportation request).

In particular embodiments, a surge multiplier and/or surge cap associated with each surge area and/or zone of a plurality of surge areas and/or zones may be communicated by the backend server 302 to a driver computing device 108 for display by the driver's application logic 220 (e.g., to encourage a driver to move towards locations with large numbers of requests). In some embodiments, when a transportation request is offered to a driver, the surge multiplier and/or surge cap is presented via application logic 220 to the driver along with other information associated with the transportation request (e.g., a pickup location and/or destination location) prior to the driver accepting or rejecting the transportation request.

In various embodiments, a surge multiplier and/or surge cap is calculated periodically for a surge location or zone such that the surge multiplier and/or surge cap does not need to be freshly calculated when a transportation request from the location or zone is received. Thus, the pre-calculated surge multiplier and/or surge cap may be ready for communication to the passenger and/or for use in tracking the fare of a transportation request. In various embodiments, multiple surge multipliers and/or surge caps may be calculated for a zone, where each surge multiplier and/or cap is associated with the zone and a respective destination zone, such that the precalculated surge multiplier and/or surge cap associated with the zone and a particular destination zone may be applied when a transportation request having a pickup location within the zone and a destination location within the particular destination zone is received.

Figure 10:
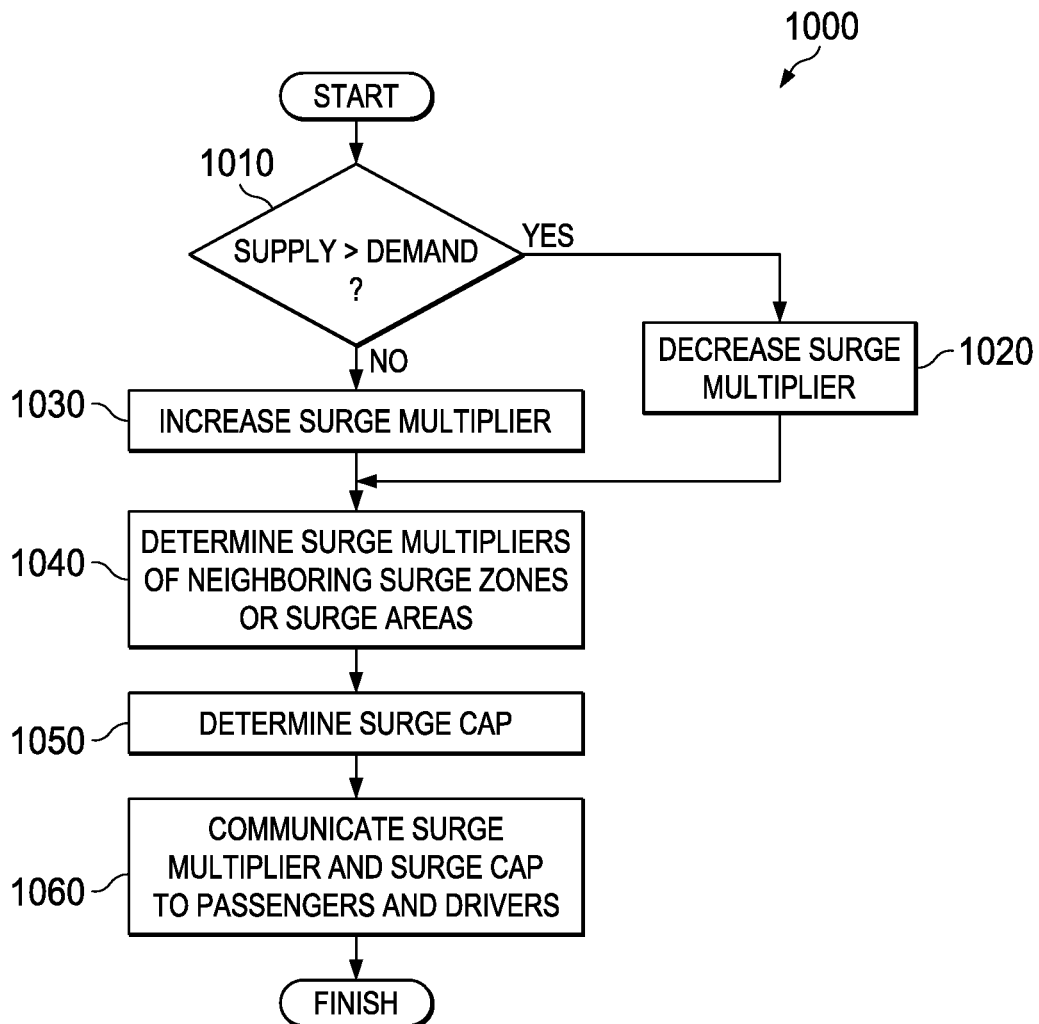
FIG. 10 is a flow chart illustrating a method in accordance with certain embodiments.

FIG. 10 illustrates an example flowchart of a method for determining a surge cap in accordance with certain embodiments. Various operations of flow 1000 may be performed, for example, by backend server 302 and/or other suitable computing device.

At 1010, the supply of drivers of a transportation system is compared against the number of transportation request. For example, it may be determined whether passenger requests are able to be fulfilled with suitable operating performances (e.g., acceptable time until pick-ups). As another example, it may be determined whether the number of pending passenger requests from passengers waiting to be picked up is growing or shrinking. The comparison of supply versus demand may be made in any other suitable manner.

If the supply of drivers is greater than the demand for drivers for a particular zone or surge area, the associated surge multiplier is decreased at 1020. If the supply of drivers is smaller than the demand for drivers, the surge multiplier is increased at 1030. In various embodiments, the amount of increase or decrease of the surge multiplier is dependent on the measured difference between supply and demand (e.g., if demand greatly outstrips supply, the surge multiplier may be increased by a greater amount than if demand was just slightly larger than supply).

At 1040, surge multipliers of neighboring surge zones or surge areas is determined. For example, the surge multipliers from a closest surge zone or surge area, multiple surge zones or areas that are immediate neighbors to the present surge zone or area, or any surge zones or areas within a fixed distance to the present surge zone or area may be determined.

At 1050, a surge cap is determined based on the surge multiplier of the present surge zone or area and/or the surge multipliers of the other surge zones and/or areas. For example, the surge cap may specify a limit on surge pricing for rides from the present surge zone or area to any of the surrounding surge zones or areas. In general, if the surrounding surge zones have high surge multipliers, then the surge cap will be set relatively large while if the surrounding surge zones have low surge multipliers, then the surge cap will be set relatively small. Once the surge multiplier and the surge cap have been determined, the values may be transmitted to one or more passengers and/or drivers at 1060.

Some of the operations illustrated in FIG. 10 may be repeated, combined, modified or deleted where appropriate, and additional steps may also be included. Additionally, operations may be performed in any suitable order or concurrently without departing from the scope of particular embodiments.

The functionality described herein may also be performed by any suitable component of the system. For example, certain functionality described herein as being performed by backend server 302, may, in various embodiments, be performed by any combination of one or more passenger computing devices 104 or driver computing devices 108 where appropriate. Similarly, certain functionality described herein as being performed by a passenger computing device 104 or a driver computing device 108 may, in various embodiments, be performed by backend server 302 where appropriate.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    receiving, by one or more processing devices of one or more servers associated with a transportation matching system and from a passenger computing device, a transportation request indicating a pickup location;
    identifying, by the one or more processing devices, a first geographic zone and a second geographic zone associated with the pickup location;
    determining, by the one or more processing devices based on the pickup location, that the first geographic zone is closer to the pickup location than the second geographic zone;
    based on determining that the first geographic zone is closer to the pickup location, generating, by the one or more processing devices, a surge gradient by weighting a surge price associated with the first geographic zone more than a surge price associated with the second geographic zone within a distance-weighted surge gradient;
    determining, by the one or more processing devices, a surge pricing multiplier for the pickup location based on the surge gradient between the first geographic zone and the second geographic zone;
    monitoring, by the one or more processing devices of the one or more servers, interactions with a plurality of passenger computing devices and a plurality of driver computing devices to determine a number of transportation requests corresponding to the plurality of passenger computing devices and a number of available driver computing devices;
    updating, by the one or more processing devices, the surge pricing multiplier for the pickup location based on the surge gradient between the first geographic zone and the second geographic zone, the number of transportation requests, and the number of available driver computing devices;
    transmitting, by the one or more processing devices for display on a graphical user interface of one or more driver computing devices associated with the transportation matching system, the transportation request and an indication of the updated surge pricing multiplier associated with the transportation request;
    receiving, by the one or more processing devices from a first driver computing device associated with a first driver, an acceptance of the transportation request; and
    transmitting, by the one or more processing devices to the first driver computing device, navigational data to direct the first driver to the pickup location to fulfill the transportation request.

2. The method of claim 1, wherein identifying the first geographic zone associated with the pickup location comprises identifying a closest geographic zone nearest to the pickup location and designated within the transportation matching system to have a particular pricing model.

3. The method of claim 2, wherein identifying the second geographic zone associated with the pickup location comprises identifying a second-closest geographic zone relative to the pickup location and designated within the transportation matching system to have a different pricing model than the first geographic zone.

4. The method of claim 1, further comprising generating the surge gradient by determining a continuously variable gradient from a first surge price at the first geographic zone and a second surge price at the second geographic zone.

5. The method of claim 1, further comprising determining the surge pricing multiplier based on limiting the surge price to be above a minimum threshold.

6. The method of claim 1, wherein determining the surge pricing multiplier comprises determining a multiplier for a price of the transportation request based on the distance-weighted surge gradient.

7. The method of claim 1, further comprising generating the surge gradient by:
identifying a first center point within the first geographic zone and a second center point within the second geographic zone; and
generating a continuous gradient between the first geographic zone and the second geographic zone based on a distance between the first center point and the second center point.

8. A non-transitory computer readable medium comprising instructions that, when executed by at least one processor, cause a computing device to:
receive, from a passenger computing device associated with a transportation matching system, a transportation request indicating a pickup location;
identify a first geographic zone and a second geographic zone associated with the pickup location;
determine, by the computing device based on the pickup location, that the first geographic zone is closer to the pickup location than the second geographic zone;
based on determining that the first geographic zone is closer to the pickup location, generate, by the computing device, a surge gradient by weighting a surge price associated with the first geographic zone more than a surge price associated with the second geographic zone within a distance-weighted surge gradient;
determine a surge pricing multiplier for the pickup location based on the surge gradient between the first geographic zone and the second geographic zone;
monitor interactions with a plurality of passenger computing devices and a plurality of driver computing devices to determine a number of transportation requests corresponding to the plurality of passenger computing devices and a number of available driver computing devices;
update the surge pricing multiplier for the pickup location based on the surge gradient between the first geographic zone and the second geographic zone, the number of transportation requests, and the number of available driver computing devices;
transmit, for display on a graphical user interface of one or more driver devices associated with the transportation matching system, the transportation request and an indication of the updated surge pricing multiplier associated with the transportation request;
receive, from a first driver computing device associated with a first driver, an acceptance of the transportation request; and
transmit, to the first driver computing device, navigational data to direct the first driver to the pickup location to fulfill the transportation request.

9. The non-transitory computer readable medium of claim 8, further comprising instructions that, when executed by the at least one processor, cause the computing device to identify the first geographic zone associated with the pickup location by identifying a closest geographic zone nearest to the pickup location and designated within the transportation matching system to have a particular pricing model.

10. The non-transitory computer readable medium of claim 9, further comprising instructions that, when executed by the at least one processor, cause the computing device to identify the second geographic zone associated with the pickup location by identifying a second-closest geographic zone relative to the pickup location and designated within the transportation matching system to have a different pricing model than the first geographic zone.

11. The non-transitory computer readable medium of claim 8, further comprising instructions that, when executed by the at least one processor, cause the computing device to generate the surge gradient by determining a continuously variable gradient from a first surge price at the first geographic zone and a second surge price at the second geographic zone.

12. The non-transitory computer readable medium of claim 8, further comprising instructions that, when executed by the at least one processor, cause the computing device to:
determine the surge pricing multiplier based on limiting the surge price to be above a minimum threshold.

13. The non-transitory computer readable medium of claim 8, further comprising instructions that, when executed by the at least one processor, cause the computing device to determine the surge pricing multiplier by determining a multiplier for a price of the transportation request based on the distance-weighted surge gradient.

14. The non-transitory computer readable medium of claim 8, further comprising instructions that, when executed by the at least one processor, cause the computing device to:
identify a first center point within the first geographic zone and a second center point within the second geographic zone; and
generate a continuous gradient between the first geographic zone and the second geographic zone based on a distance between the first center point and the second center point.

15. A system comprising:
at least one processor; and
a non-transitory computer readable medium comprising instructions that, when executed by the at least one processor, cause the system to:
receive, from a passenger device associated with a transportation matching system, a transportation request indicating a pickup location;
identify a first geographic zone and a second geographic zone associated with the pickup location;
determine, based on the pickup location, that the first geographic zone is closer to the pickup location than the second geographic zone;
based on determining that the first geographic zone is closer to the pickup location, generate a surge gradient by weighting a surge price associated with the first geographic zone more than a surge price associated with the second geographic zone within a distance-weighted surge gradient;
determine a surge pricing multiplier for the pickup location based on the surge gradient between the first geographic zone and the second geographic zone;
monitor interactions with a plurality of passenger computing devices and a plurality of driver computing devices to determine a number of transportation requests corresponding to the plurality of passenger computing devices and a number of available driver computing devices;
update the surge pricing multiplier for the pickup location based on the surge gradient between the first geographic zone and the second geographic zone;
transmit, for display on a graphical user interface of one or more driver devices associated with the transportation matching system, the transportation request and an indication of the updated surge pricing multiplier associated with the transportation request;

receive, from a first driver computing device associated with a first driver, an acceptance of the transportation request; and transmit, to the first driver computing device, navigational data to direct the first driver to the pickup location to fulfill the transportation request.

16. The system of claim 15, further comprising instructions that, when executed by the at least one processor, cause the system to identify the first geographic zone associated with the pickup location by identifying a closest geographic zone nearest to the pickup location and designated within the transportation matching system to have a particular pricing model.

17. The system of claim 16, further comprising instructions that, when executed by the at least one processor, cause the system to identify the second geographic zone associated with the pickup location by identifying a second-closest geographic zone relative to the pickup location and designated within the transportation matching system to have a different pricing model than the first geographic zone.

18. The system of claim 15, further comprising instructions that, when executed by the at least one processor, cause the system to generate the surge gradient by determining a continuously variable gradient from a first surge price at the first geographic zone and a second surge price at the second geographic zone.

19. The system of claim 15, further comprising instructions that, when executed by the at least one processor, cause the system to determine the surge pricing multiplier based on limiting the surge price to be above a minimum threshold.

20. The system of claim 15, further comprising instructions that, when executed by the at least one processor, cause the system to determine the surge pricing multiplier by determining a multiplier for a price of the transportation request based on the distance-weighted surge gradient.

* * * * *